(12) United States Patent
Cooley et al.

(10) Patent No.: US 7,809,797 B2
(45) Date of Patent: Oct. 5, 2010

(54) PARENTAL CONTROL USING SOCIAL METRICS SYSTEM AND METHOD

(75) Inventors: Shaun Cooley, El Segundo, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 402 days.

(21) Appl. No.: 11/697,467

(22) Filed: Apr. 6, 2007

(65) Prior Publication Data

US 2008/0250471 A1    Oct. 9, 2008

(51) Int. Cl.
*G06F 15/16* (2006.01)
(52) U.S. Cl. .................. 709/206; 709/204; 709/205; 726/3; 726/4; 726/27
(58) Field of Classification Search ......... 709/204–207; 726/3–4, 27
See application file for complete search history.

(56) References Cited

U.S. PATENT DOCUMENTS

| | | | | |
|---|---|---|---|---|
| 7,209,957 B2 * | 4/2007 | Patron et al. | ................ | 709/208 |
| 7,480,696 B2 * | 1/2009 | Kirkland et al. | ............. | 709/207 |
| 2005/0160144 A1 * | 7/2005 | Bhatia | ........................ | 709/206 |
| 2006/0282426 A1 * | 12/2006 | Spears | ............................ | 707/5 |
| 2007/0055754 A1 | 3/2007 | Robbin et al. | ............... | 709/223 |
| 2007/0271367 A1 | 11/2007 | Yardeni et al. | .............. | 709/223 |

FOREIGN PATENT DOCUMENTS

| WO | WO 2005/062843 | * | 7/2005 |
|---|---|---|---|
| WO | WO 2005/081664 | * | 9/2005 |

OTHER PUBLICATIONS

"NetIDme Chatshield", copyright dated 2007; downloaded Jul. 1, 2008 from: http://www.chatshield.com/ and http://www.netidme.net/chatshield.htm.
"Exploreanywhere Parental Control Suite with ChatBlocker", copyright dated 2008; downloaded Jul. 1, 2008 from: http://www.onlinesafetysite.com/P1/ParentalControl.htm.

* cited by examiner

*Primary Examiner*—Duyen M Doan
(74) *Attorney, Agent, or Firm*—Gunnison, McKay & Hodgson, L.L.P.; Forrest Gunnison

(57) ABSTRACT

A parent defines friend rules for on-line association with their child. Upon a request of an on-line stranger to be a new friend of the child, stranger information about the on-line stranger is retrieved and compared to the friend rules to determine whether the stranger is allowed, blocked or restricted from being a friend with the child. Accordingly, the parent only has to use a minimal amount of time in establishing the friend rules to protect the parent's child from on-line strangers.

13 Claims, 4 Drawing Sheets

PARENTAL CONTROL USING SOCIAL METRICS SYSTEM AND METHOD

BACKGROUND OF THE INVENTION

1. Field of the Invention

The present invention relates to the protection of computer system users. More particularly, the present invention relates to a system and method of using social metrics in a parental control application.

2. Description of Related Art

IM is short for instant message, a type of communications service that enables a computer system user to create a kind of private chat room with another computer system user, sometimes called an IM friend or buddy, in order to communicate in real time over the Internet. IM is analogous to a telephone conversation but using text-based, not voice-based, communication.

However, an IM friend can be a threat, e.g., can be an adult trying to form an unauthorized relationship with a child. Accordingly, many parents restrict who is allowed to be an IM friend with their child.

Unfortunately, managing a child's IM friends is a tedious task for a parent. Typically, the only information available to a parent in deciding whether to allow or block an IM friend is the word of their child and the screen name of the IM friend. Accordingly, even after allowing their child to have an IM friend, a parent often must repetitively discuss the behavior of the child's IM friends to insure the IM friends are not a threat.

Of course, many parents will fail to closely monitor their child's IM friends, or their child will not be entirely truthful about the behavior of the child's IM friends. In either event, the child has an increased vulnerability to any IM friend that is an actual threat.

SUMMARY OF THE INVENTION

In accordance with one embodiment, a parent defines friend rules for on-line association, e.g., IM communication, with their child. Upon a request of an on-line stranger to be a new friend of the child, stranger information about the on-line stranger is retrieved and compared to the friend rules to determine whether the stranger is allowed, blocked or restricted from being a friend with the child.

In the above manner, only if the on-line stranger satisfies the criteria established by the parent, the on-line association between their child and the on-line stranger is allowed. Otherwise, the on-line association between their child and the on-line stranger is blocked or restricted, e.g., logged for future evaluation by the parent. Accordingly, the parent only has to use a minimal amount of time in establishing the friend rules to protect the parent's child from on-line strangers.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
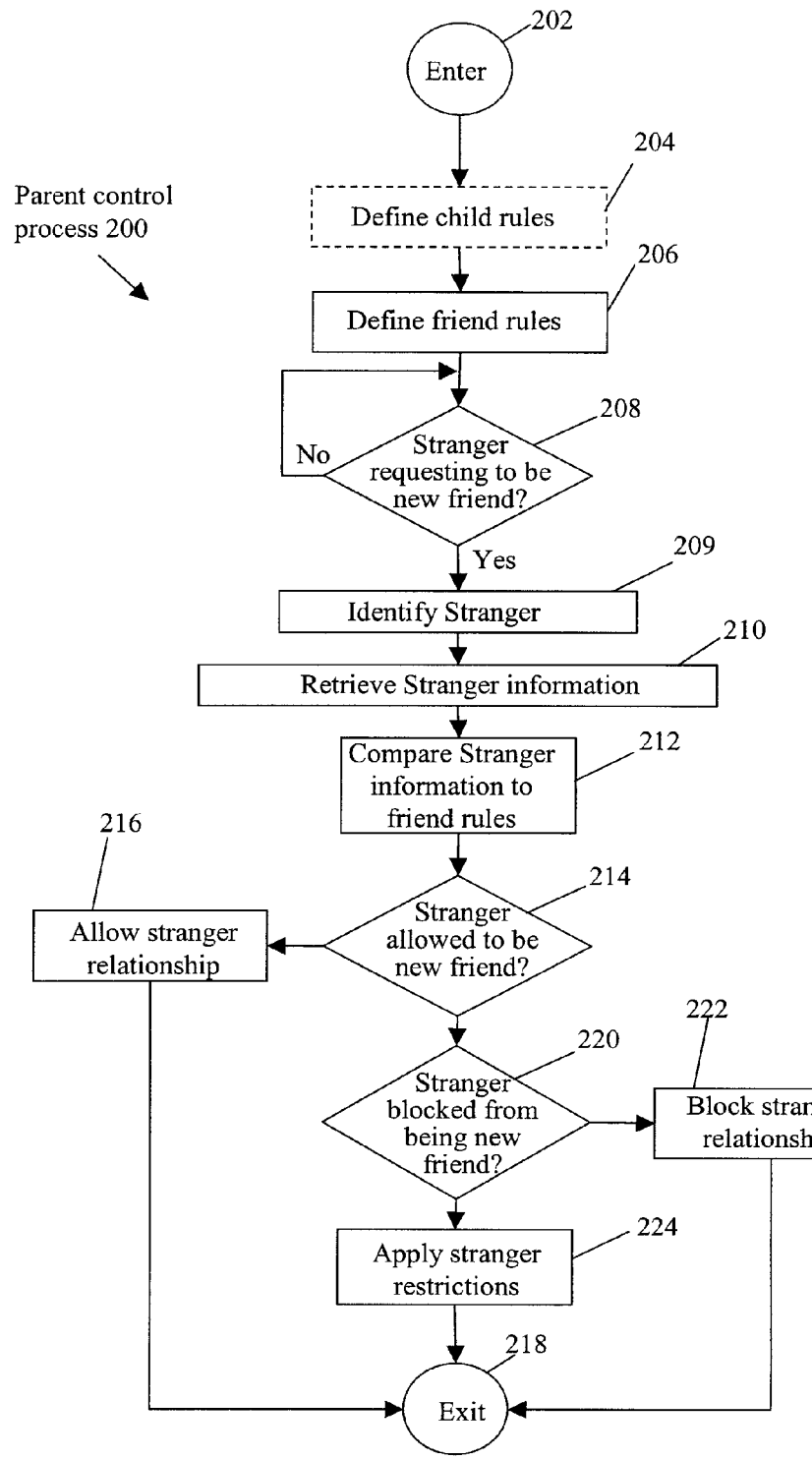
FIG. 2 is a flow diagram of a parent control process in accordance with one embodiment of the present invention.

In accordance with one embodiment, referring to FIG. 2, a parent defines friend rules for on-line association, e.g., IM communication, with their child (OPERATION 206). Upon a request of an on-line stranger to be a new friend of the child (CHECK OPERATION 208), stranger information about the on-line stranger is retrieved (OPERATION 210) and compared to the friend rules (OPERATION 212) to determine whether the stranger is allowed (CHECK OPERATION 214), blocked (CHECK OPERATION 220) or restricted (OPERATION 224) from being a friend with the child.

In the above manner, only if the on-line stranger satisfies the criteria established by the parent, the on-line association between their child and the on-line stranger is allowed. Otherwise, the on-line association between their child and the on-line stranger is blocked or restricted, e.g., logged for future evaluation by the parent. Accordingly, the parent only has to use a minimal amount of time in establishing the friend rules to protect the parent's child from on-line strangers.

Figure 1:
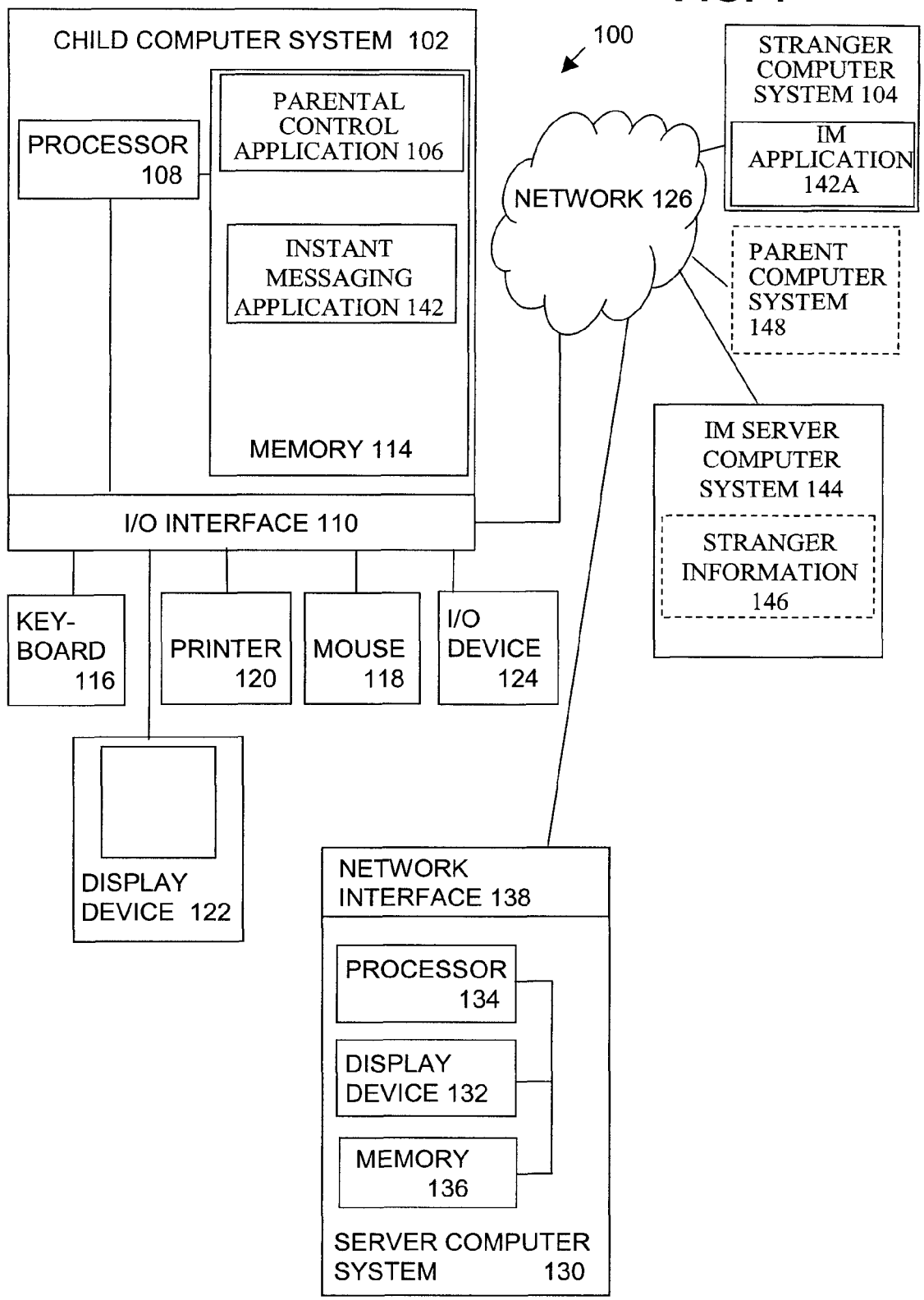
FIG. 1 is a diagram of a client-server system that includes a parental control application executing on a child computer system in accordance with one embodiment of the present invention.

More particularly, referring to FIG. 1, FIG. 1 is a diagram of a client-server system 100 that includes a parental control application 106 executing on a child computer system 102, e.g., a first computer system, in accordance with one embodiment of the present invention.

Child computer system 102, sometimes called a client or user device, typically includes a central processing unit (CPU) 108, hereinafter processor 108, an input output (I/O) interface 110, and a memory 114.

Memory 114 includes parental control application 106 and an instant messaging (IM) application 142. Instant messaging application 142 is any one of a number of conventional instant messaging applications and the particular instant messaging application is not essential to this embodiment.

Child computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from child computer system 102. In one embodiment, parental control application 106 is loaded into child computer system 102 via I/O device 124, such as from a CD, DVD or floppy disk containing parental control application 106.

Child computer system 102 is coupled to a server computer system 130 of client-server system 100 by a network 126. Server computer system 130 typically includes a display device 132, a processor 134, a memory 136, and a network interface 138.

Further, child computer system 102 is also coupled to a stranger computer system 104, and an instant message (IM) server computer system 144 by network 126. In one embodiment, stranger computer system 104 and IM server computer system 144 are similar to child computer system 102 and/or server computer system 130, for example, include a central processing unit, an input output (I/O) interface, and a memory.

Stranger computer system 104, and IM server computer system 144 may further include standard devices like a keyboard, a mouse, a printer, a display device and an I/O device(s). The various hardware components of stranger computer system 104, and IM server computer system 144 are not illustrated to avoid detracting from the principles of the invention.

IM server computer system 144 is a computer system that manages instant messaging. IM server computer system 144 enables a large number of IM users to exchange information, i.e., instant messages, in an environment that offers real-time discussion capabilities.

To illustrate, stranger computer system 104 includes an instant messaging application 142A similar to instant messaging application 142 of child computer system 102. IM server computer system 144 manages instant messaging between child computer system 102 using instant messaging application 142 and stranger computer system 104 using instant messaging application 142A.

In accordance with one embodiment, IM server computer system 144 includes stranger information 146. Stranger information 146 includes information about the user, sometimes called a stranger, of stranger computer system 104. Stranger information 146 is discussed further below.

Optionally, child computer system 102 is also coupled to a parent computer system 148 by network 126. In one embodiment, parent computer system 148 is similar to child computer system 102 and/or server computer system 130, for example, include a central processing unit, an input output (I/O) interface, and a memory.

Parent computer system 148 may further include standard devices like a keyboard, a mouse, a printer, a display device and an I/O device(s). The various hardware components of parent computer system 148 are not illustrated to avoid detracting from the principles of the invention.

Parent computer system 148 is used to configure parent control application 106 of child computer system 102 according to the preferences of the user of parent computer system 148, e.g., the parent.

In another embodiment, the parent configures parental control application 106 using child computer system 102 directly. In accordance with this embodiment, parent computer system 148 as a separate computer system is unnecessary and thus not used. Accordingly, parent computer system 148 is optional.

Network 126 can be any network or network system that is of interest to a user. In various embodiments, network interface 138 and I/O interface 110 include analog modems, digital modems, or a network interface card.

For simplicity of discussion, the user of child computer system 102 is herein referred to as a child, the user of stranger computer system 104 is herein referred to as a stranger or neighborhood child, and the user of parent computer system 148 is herein referred to as the parent. Generally however, the user of child computer system 102 is a first user, the user of stranger computer system 104 is a second user, and the user of parent computer system 148 is a third user providing restrictions on the interactions, e.g., instant messaging, between the first user and the second user.

To illustrate, the first user of child computer system 102 is a corporate employee, the second user of stranger computer system 104 is a non-employee, and the user or of parent computer system 148 is a corporate computer administrator. Any one of a number of relationships between the first user, the second user, and the third user are possible.

Parental control application 106 is stored in memory 114 of child computer system 102 and executed on child computer system 102. However, in other embodiments, some or all of the functionality or modules of parental control application 106 are stored and/or executed on computer systems other than child computer system 102, e.g., on parent computer system 148, IM server computer system 144, and/or on server computer system 130.

The particular type of and configuration of child computer system 102, stranger computer system 104, IM server computer system 144, parent computer system 148, and server computer system 130 are not essential to this embodiment of the present invention.

FIG. 2 is a flow diagram of a parent control process 200 in accordance with one embodiment of the present invention. Referring now to FIGS. 1 and 2 together, execution of parental control application 106 by processor 108 results in the operations of parent control process 200 as described below in one embodiment.

Figure 3:
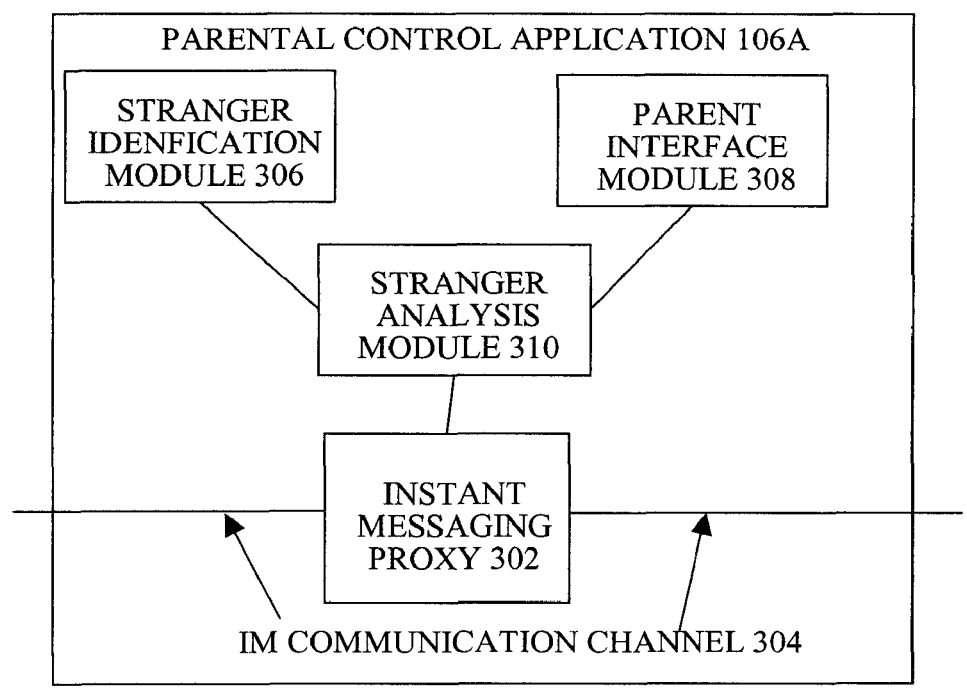
FIG. 3 is a block diagram illustrating a parental control application in accordance with one embodiment of the present invention.

FIG. 3 is a block diagram illustrating a parental control application 106A in accordance with one embodiment of the present invention. Parental control application 106A of FIG. 3 is similar or identical to parental control application 106 of FIG. 1 yet includes more details.

Referring now to FIG. 3, parental control application 106A includes five components in accordance with this embodiment: 1) an instant messaging proxy 302; 2) an instant messaging (IM) communication channel 304; 3) a stranger identification module 306; 4) a parent interface module 308; and 5) a stranger analysis module 310.

Referring now to FIGS. 1, 2 and 3 together, from an ENTER OPERATION 202, flow moves optionally to a DEFINE CHILD RULES OPERATION 204. In DEFINE CHILD RULES OPERATION 204, child rules for the child, e.g., the user of child computer system 102, are defined by the parent, e.g., the user of parent computer system 148. Illustratively, the parent uses parent interface module 308 to define the child rules.

Parent interface module 308 is a mechanism that allows a parent to define the child rules. In one embodiment, parent interface module 308 is a web site. In another example, parent interface module 308 is an application downloaded to child computer system 102, e.g., from server computer system 130 or elsewhere. Parent interface module 308 stores information, e.g., the child rules, remotely such as in stranger information 146 on IM server computer system 144. In another example, parent interface module 308 stores information in a local data store on-child computer system 102.

In one embodiment, the child rules are the off-line rules for the child imposed by (defined by) the parent. The child rules consist of what, where, when, and how rules, or combinations thereof.

A what rule is a rule that defines an activity the child is allowed to participate in. To illustrate, what rules include the ratings of the television, video games, movies, and other entertainment that the child is allowed to participate in.

A where rule defines where the child is allowed to participate in an allowable activity. A when rule defines when the child is allowed to participate in an allowable activity. A how rule defines how the child is allowed to participate in an allowable activity. The what, where, when, and how rules are sometimes combined to form the child rules.

In accordance with various embodiments, examples of child rules include: 1) a child is allowed to play console based video games in their bedroom from 6 PM to 8 PM daily; 2) a child can watch television (TV) in the living room from 5 PM to 6 PM daily; 3) a child can only watch TV-PG and under shows in their bedroom but can watch TV-14 rated TV shows in the living room with a parent present.

In other embodiments, child rules are not limited to entertainment and also include other activities that the child is allowed to participate in. To illustrate, child rules include whether the child is allowed sweets, e.g., candy, caffeinated beverages, use of vulgar language, use of disrespectful language, and use of disrespectful titles. Other examples of child rules include where the child is allowed to be without a parent, e.g., at home, in the neighborhood, in the shopping mall, or at a friend's house. Any one of a number of child rules can be defined depending upon the particular restrictions placed on the child by the parent.

By defining child rules for their child, parents are able to share as much relevant information about their own values and policies as possible so that the information (child rules) can be used in making decisions about allowing, denying, or restricting, e.g., monitoring, associations between their child and strangers as set forth further below.

From DEFINE CHILD RULES OPERATION 204 (or directly from ENTER OPERATION 202 if DEFINE CHILD RULES OPERATION 204 is not perform), flow moves to a DEFINE FRIEND RULES OPERATION 206. In DEFINE FRIEND RULES OPERATION 206, friend rules for association with the child are defined by the parent.

Parent interface module 308 is also a mechanism that allows a parent to define the friend rules. In one embodiment, parent interface module 308 is a web site. In another example, parent interface module 308 is an application downloaded to child computer system 102, e.g., from server computer system 130 or elsewhere. Parent interface module 308 stores information, e.g., the friend rules, remotely such as in stranger information 146 on IM server computer system 144. In another example, parent interface module 308 stores information in a local data store on child computer system 102.

In one embodiment, friend rules are the rules that define whether another person, e.g., a computer system user such as a stranger, is allowed, blocked or restricted from associating with, e.g., being a friend of, the child. More particularly, a friend, sometimes called an on-line buddy, is a person allowed to associate with the child as defined by the friend rules. Stranger information, e.g., stranger rules, about the stranger is compared to the friend rules to determine what type of relationship (allowed, blocked, or restricted) the stranger is allowed to have with the child.

In one example, friend rules are defined relative to the child rules defined in DEFINE CHILD RULES OPERATION 204. In a simple example, the friend rules require that the stranger rules are the same as the child rules, i.e., a person having the exact same rules as the child is allowed to be a friend. This is sometimes called an AND condition.

In another example, the friend rules require that the stranger rules are substantially similar to the child rules defined in DEFINE CHILD RULES OPERATION 204. For example, the friend rules require that a first set of the stranger rules is the same as a first set of the child rules, yet allow a second set of the stranger rules to be different than a second set of the child rules. In accordance with this example, as long as the stranger has a basic set of rules, e.g., one rule, in common with the child, the stranger is allowed to be a friend, even though the stranger has other rules that are inconsistent with the rules of the child.

In accordance with another example, the friend rules require that a first set of the stranger rules be the same as a first set of the child rules, and if the first set of the stranger rules is different than the first set of the child rules, then the stranger is blocked from being a friend. In accordance with this example, if the stranger does not have a basic set of rules in common with the child, the stranger is blocked from being a friend, even though the stranger may have other rules that are consistent with the rules of the child.

For example, the child rules prohibit the child from using vulgar language, eating candy and drinking caffeinated beverages. The friend rules require that if the stranger rules allow the stranger to use vulgar language, eat candy or drink caffeinated beverages, then the stranger is blocked from being a friend.

In accordance with another example, the friend rules require that the stranger rules exist. More particularly, if the stranger does not have any stranger rules, then the stranger is blocked from being a friend.

In another example, the friend rules require that the stranger rules are statistically similar to the child rules defined in DEFINE CHILD RULES OPERATION 204. For example, the friend rules require that the stranger rules are similar to a defined percent, e.g., 70 percent, to the child rules. In accordance with this example, as long as the stranger rules are 70 percent in common with the child, the stranger is allowed to be a friend, even though the stranger has other rules (30 percent) which are inconsistent with the rules of the child.

As set forth above, DEFINE CHILD RULES OPERATION 204 is optional and in one embodiment is not performed. In accordance with this embodiment, friend rules are defined independent of the child rules, which may or may not exist. In one example, friend rules are based on specific social networking characteristics (metrics) and specify thresholds at which the stranger will be allowed, blocked, or restricted. In one embodiment, social networking characteristics are characteristics of the social network of the stranger. The social network is the on-line relationships of the stranger. Accordingly, in one embodiment, the social networking characteristics are the characteristics, e.g., the type of, on-line relationships of the stranger.

In accordance with various embodiments, examples of friend rules to be a friend include: 1) the stranger must be a friend of more than N, e.g., ten, of the child's friends; 2) the stranger must be a friend of more than N, e.g., ten, of friends of the child's friends; 3) the stranger must have X %, e.g., 70%, of friends in common with the child; 4) the stranger must have Y, e.g., ten, exact friends as the child.

Other examples of friend rules include that the stranger must go to the same school as the child, must be in the same age range as the child, and/or must be in the same geographic vicinity as the child.

In another example, the friend rules set forth range conditions, i.e., that the values must have a minimum, a maximum or a minimum and maximum. The range conditions can be centered on the child rules.

To illustrate various examples, the friend rules set forth that the stranger is allowed to be a friend only if the amount of time that the stranger is allowed to play video games is: (1) within plus or minus one hour of the amount of time that the child is allowed to play video games; (2) no less than one hour per day; (3) no more than two hours per day; or (4) no less than one hour per day and no more than two hours per day, and so forth.

In another example, the friend rules require an OR, AND, or XOR condition. An OR condition requires that the stranger satisfies at least one defined constraint. An AND condition requires that the stranger satisfies all defined constraints. An XOR condition requires that the stranger satisfy one particular constrain. One example of an XOR condition is that if the stranger is a friend of more than N, e.g., ten, of the child's friends, then the stranger is allowed to be a friend. Another example of an XOR condition is that if the stranger is not within a specified geographical range, the stranger is blocked from being a friend. Generally, any of the friend rules as set forth herein can be considered in any combination, e.g., an OR condition, an AND condition, and/or an XOR condition.

Any one of a number of friend rules can be defined depending upon the particular constraints placed upon allowable, blocked, and/or restricted relationships with the child by the parent.

From DEFINE FRIEND RULES OPERATION 206, flow moves to a STRANGER REQUESTING TO BE NEW FRIEND CHECK OPERATION 208. In STRANGER REQUESTING TO BE NEW FRIEND CHECK OPERATION 208, a determination is made as to whether a stranger is requesting to be a new friend of the child.

If there is not a stranger requesting to be a new friend, flow remains at STRANGER REQUESTING TO BE NEW FRIEND CHECK OPERATION 208. Conversely, if a stranger is requesting to be a new friend, flow moves from STRANGER REQUESTING TO BE NEW FRIEND CHECK OPERATION 208 to an IDENTIFY STRANGER OPERATION 209.

Illustratively, a stranger is requesting to be a friend of the child by attempting to initiate an IM session with the child. This request is intercepted with instant messaging proxy 302 of parental control application 106A of FIG. 3.

More particularly, IM communication channel 304 supports varying levels of communications in accordance with varying examples. Illustratively, IM communication channel 304 supports text only, limited HTML, or full HTML communications. A stranger using stranger computer system 104 attempts to initiate an IM session with the child over IM communication channel 304. This attempt is intercepted by instant messaging proxy 302.

Instant messaging proxy 302 is a component for proxying IM communications over IM communication channel 304. Instant messaging proxy 302 facilitates capturing (intercepting), modifying, deleting, and injection IM messages into both inbound and outbound IM communications over IM communication channel 304. An inbound IM communication is an IM communication over IM communication channel 304 being sent to (received by) child computer system 102. Conversely, an outbound IM communication is an IM communication over IM communication channel 304 being sent from (transmitted by) child computer system 102.

Accordingly, upon a stranger requesting to be a new friend, flow moves from STRANGER REQUESTING TO BE NEW FRIEND CHECK OPERATION 208 to IDENTIFY STRANGER OPERATION 209. In IDENTIFY STRANGER OPERATION 209, the stranger requesting to be a new friend is identified.

In one embodiment, stranger identification module 306 is used to identify the stranger. In one example, stranger identification module 306 is a third party identification system that requires a stranger to register with the identification system. In another example, stranger identification module 306 is built into IM server computer system 144.

In one embodiment, a stranger is identified by a unique identifier, e.g., a numeric value. For example, the IM communication from the stranger includes a unique identifier encoded in the IM communication. This unique identifier is retrieved and used to identify the stranger in IDENTIFY STRANGER OPERATION 209.

Generally, stranger identification module 306 is a mechanism for identifying the stranger and the particular technique used to identify the stranger is not essential to this embodiment.

From IDENTIFY STRANGER OPERATION 209, flow moves to a RETRIEVE STRANGER INFORMATION OPERATION 210. In RETRIEVE STRANGER INFORMATION OPERATION 210, stranger information about the stranger is retrieved, e.g., from stranger information 146 on IM server computer system 144.

In one embodiment, stranger analysis module 310 and/or stranger identification module 306 retrieves the stranger information based on the identification of the stranger in IDENTIFY STRANGER OPERATION 209. Illustratively, the unique identifier of the stranger is used as an index into stranger information 146, e.g., a database of stranger information for many strangers.

In one embodiment, the stranger information includes the social network characteristics of the stranger as discussed above. For example, the stranger has a parental control application similar or the same as parental control application 106A running on stranger computer system 104, and the parental control application collects the social network characteristics of the stranger and provides the information. In another example, IM server computer system 144 collects the social network characteristics of the stranger (and all IM users) and provides the information.

In another embodiment, the stranger information includes the child rules defined by the parent of the stranger, e.g., a neighborhood child. The child rules are provided from their storage location using any one of a number of techniques. The particular technique used to provide the child rules is not essential to this embodiment. However, several examples of techniques to provide the child rules are discussed further below in reference to FIGS. 4 and 5.

From RETRIEVE STRANGER INFORMATION OPERATION 210, flow moves to a COMPARE STRANGER INFORMATION TO FRIEND RULES OPERATION 212. In COMPARE STRANGER INFORMATION TO FRIEND RULES OPERATION 212, the stranger information is compared to the friend rules for the child to determine if: (1) the stranger is allowed to be a new friend (CHECK OPERATION 214); (2) the stranger is blocked from being a new friend (CHECK OPERATION 220); and (3) the stranger is restricted in being a new friend (OPERATION 224).

In one embodiment, stranger analysis module 310 is used to compare the stranger information to the friend rules. The comparison is a comparison matrix in a simple example. In a more complex example, the comparison is a fuzzy comparison with a report of statistical similarity.

From COMPARE STRANGER INFORMATION TO FRIEND RULES OPERATION 212, flow moves to a STRANGER ALLOWED TO BE NEW FRIEND CHECK OPERATION 214. In STRANGER ALLOWED TO BE NEW FRIEND CHECK OPERATION 214, a determination is made as to whether the stranger is allowed to be a new friend. If the stranger is allowed to be a new friend, flow moves to an ALLOW STRANGER RELATIONSHIP OPERATION 216.

In ALLOW STRANGER RELATIONSHIP OPERATION 216, the stranger relationship is allowed, i.e., the stranger is allowed to be a new friend. Accordingly, IM communications between the stranger and the child are allowed, e.g., by instant messaging proxy 302. From ALLOW STRANGER RELATIONSHIP OPERATION 216, flow moves to and exits at an EXIT OPERATION 218 or returns to STRANGER REQUESTING TO BE NEW FRIEND CHECK OPERATION 208 and awaits the request of the next stranger to be a new friend.

However, upon a determination that the stranger is not allowed to be a new friend, flow moves from STRANGER ALLOWED TO BE NEW FRIEND CHECK OPERATION 214 to a STRANGER BLOCKED FROM BEING NEW FRIEND CHECK OPERATION 220. In STRANGER BLOCKED FROM BEING NEW FRIEND CHECK OPERATION 220, a determination is made as to whether the stranger is blocked from being a new friend. If the stranger is blocked from being a new friend, flow moves from STRANGER BLOCKED FROM BEING NEW FRIEND CHECK OPERATION 220 to a BLOCK STRANGER RELATIONSHIP OPERATION 222.

In BLOCK STRANGER RELATIONSHIP OPERATION 222, a relationship with the stranger is blocked. Illustratively, any IM communications to or from the stranger are blocked, e.g., with instant messaging proxy 302. Instant messaging proxy 302 injects an instant message notifying the child and/or stranger that the relationship is blocked in one example. From BLOCK STRANGER RELATIONSHIP OPERATION 222, flow moves to and exits at EXIT OPERATION 218 or returns to STRANGER REQUESTING TO BE NEW FRIEND CHECK OPERATION 208 and awaits the request of the next stranger to be a new friend.

Conversely, upon a determination that the stranger is not blocked from being a new friend, flow moves from STRANGER BLOCKED FROM BEING NEW FRIEND CHECK OPERATION 220 to an APPLY STRANGER RESTRICTIONS OPERATION 224. In accordance with this example, the stranger is neither allowed to be a new friend nor is blocked from being a new friend. Accordingly, catchall stranger restrictions are applied in APPLY STRANGER RESTRICTIONS OPERATION 224.

In one embodiment, the stranger relationship is allowed, however, all IM communications between the child and stranger are logged, e.g., to server system 130, IM server computer system 144, parent computer system 148, and/or child computer system 102. In this manner, the parent can later review the IM communications between the child and the stranger to determine if the relationship should be blocked or allowed to continue. From APPLY STRANGER RESTRICTIONS OPERATION 224, flow moves to and exits at EXIT OPERATION 218 or returns to STRANGER REQUESTING TO BE NEW FRIEND CHECK OPERATION 208 and awaits the request of the next stranger to be a new friend.

In the above manner, a parent is able to define friend rules that specify whether a stranger is allowed, blocked or restricted from having an IM session with their child. Stranger information about a stranger attempting to be a new friend with their child is retrieved and compared to the friend rules established by the parent. Only if the stranger satisfies the criteria established by the parent, the IM session between their child and the stranger is allowed. Otherwise, the IM session between their child and the stranger is blocked or restricted, e.g., logged for future evaluation by the parent. Accordingly, the parent only has to use a minimal amount of time in establishing the friend rules to protect the parent's child from on-line strangers.

Although CHECK OPERATION 214 is set forth as proceeding CHECK OPERATION 220 in FIG. 2, it is to be understood that the order is not limiting. CHECK OPERATION 220 can occur prior to or simultaneously with CHECK OPERATION 214.

To illustrate some of the examples set forth above, the friend rules require that the stranger rules are the same as the child rules, i.e., a person having the exact same rules as the child is allowed to be a friend. Thus, if the stranger rules are the same as the child rules, a determination is made that the stranger is allowed to be a new friend in CHECK OPERATION 214 and the stranger relationship is allowed in ALLOW STRANGER RELATIONSHIP OPERATION 216. Conversely, if the stranger rules are not the same as the child rules, a determination is made that: (1) the stranger is not allowed to be a new friend in CHECK OPERATION 214; and (2) that the stranger is not blocked from being a new friend in CHECK OPERATION 220. Accordingly, the stranger restrictions are applied in APPLY STRANGER RESTRICTIONS OPERATION 224, e.g., all IM communications between the child and stranger are logged.

In another example, the friend rules require that a first set of the stranger rules be the same as a first set of the child rules, yet allow a second set of the stranger rules to be different than a second set of the child rules. In accordance with this example, if the stranger has a basic set of rules in common with the child, a determination is made that the stranger is allowed to be a friend in CHECK OPERATION 214 and the stranger relationship is allowed in ALLOW STRANGER RELATIONSHIP OPERATION 216, even though the stranger has other rules which are inconsistent with the rules of the child. Conversely, if the stranger does not have a basic set of rules in common with the child, a determination is made that: (1) the stranger is not allowed to be a new friend in CHECK OPERATION 214; and (2) that the stranger is not blocked from being a new friend in CHECK OPERATION 220. Accordingly, the stranger restrictions are applied in APPLY STRANGER RESTRICTIONS OPERATION 224, e.g., all IM communications between the child and stranger are logged.

In accordance with another example, the friend rules require that if a first set of the stranger rules is different than a first set of the child rules, then the stranger is blocked from being a friend. In accordance with this example, if the stranger does not have a basic set of rules in common with the child, a determination is made that the stranger is not allowed to be new friend in CHECK OPERATION 214, and a determination is made that the stranger is blocked from being a new friend in CHECK OPERATION 220. Accordingly, the stranger relationship is blocked in BLOCK STRANGER RELATIONSHIP OPERATION 222, e.g., any IM communications to or from the stranger are blocked.

In another example, the friend rules require that the stranger rules are similar to a defined percent, e.g., 70 percent, to the child rules. In accordance with this example, if the stranger rules are 70 percent or more in common with the child, a determination is made that the stranger is allowed to be a friend in CHECK OPERATION 214 and the stranger relationship is allowed in ALLOW STRANGER RELATIONSHIP OPERATION 216, even though the stranger has other rules which are inconsistent with the rules of the child. Conversely, if the stranger rules are 69 percent or less in common with the child, a determination is made that: (1) the stranger is not allowed to be a new friend in CHECK OPERATION 214; and (2) that the stranger is not blocked from being a new friend in CHECK OPERATION 220. Accordingly, the stranger restrictions are applied in APPLY STRANGER RESTRICTIONS OPERATION 224, e.g., all IM communications between the child and stranger are logged.

In accordance with another example, the friend rules require that the stranger must be a friend of more than ten of the child's friends. In accordance with this example, if the stranger is a friend of more than ten of the child's friends, a determination is made that the stranger is allowed to be a friend in CHECK OPERATION 214 and the stranger relationship is allowed in ALLOW STRANGER RELATIONSHIP OPERATION 216. Conversely, if the stranger is a friend of ten or less (e.g., none) of the child's friends, a determination is made that: (1) the stranger is not allowed to be a new friend in CHECK OPERATION 214; and (2) that the stranger is not blocked from being a new friend in CHECK OPERATION 220. Accordingly, the stranger restrictions are applied in APPLY STRANGER RESTRICTIONS OPERATION 224, e.g., all IM communications between the child and stranger are logged.

In accordance with another example, the friend rules require that the stranger must be a friend of more than ten of friends of the child's friends. In accordance with this example, if the stranger is a friend of more than ten of friends of the child's friends, a determination is made that the stranger is allowed to be a friend in CHECK OPERATION 214 and the stranger relationship is allowed in ALLOW STRANGER RELATIONSHIP OPERATION 216. Conversely, if the stranger is a friend of ten or less (e.g., none) of friends of the child's friends, a determination is made that: (1) the stranger is not allowed to be a new friend in CHECK OPERATION 214; and (2) that the stranger is not blocked from being a new friend in CHECK OPERATION 220. Accordingly, the stranger restrictions are applied in APPLY STRANGER RESTRICTIONS OPERATION 224, e.g., all IM communications between the child and stranger are logged.

In accordance with another example, the friend rules require that the stranger must have 70% or more of friends in common with the child. In accordance with this example, if the stranger has 70% or more of friends in common with the child, a determination is made that the stranger is allowed to be a friend in CHECK OPERATION 214 and the stranger relationship is allowed in ALLOW STRANGER RELATIONSHIP OPERATION 216. Conversely, if the stranger has 69% or less (e.g., none) of friends in common with the child, a determination is made that: (1) the stranger is not allowed to be a new friend in CHECK OPERATION 214; and (2) that the stranger is not blocked from being a new friend in CHECK OPERATION 220. Accordingly, the stranger restrictions are applied in APPLY STRANGER RESTRICTIONS OPERATION 224, e.g., all IM communications between the child and stranger are logged.

In accordance with another example, the friend rules require that the stranger must have ten exact friends as the child. In accordance with this example, if the stranger has the same ten exact friends as the child, a determination is made that the stranger is allowed to be a friend in CHECK OPERATION 214 and the stranger relationship is allowed in ALLOW STRANGER RELATIONSHIP OPERATION 216. Conversely, if the stranger does not have the same ten exact friends as the child, a determination is made that: (1) the stranger is not allowed to be a new friend in CHECK OPERATION 214; and (2) that the stranger is not blocked from being a new friend in CHECK OPERATION 220. Accordingly, the stranger restrictions are applied in APPLY STRANGER RESTRICTIONS OPERATION 224, e.g., all IM communications between the child and stranger are logged.

Although IM communications are discussed above, embodiments are applicable to any electronic communication with a child. For example, systems and methods in accordance with various embodiments are applicable to e-mail messages, texting (Short Message Service or SMS) on cellular telephones, community based video games that have chat functionality, myspace, Internet Relay Chat (IRC), Voice over Internet Protocol (VoIP), or other electronic communications.

Further, in another embodiment, a parent can identify strangers (e.g., other children) that their child should be interacting with based on child rules defined by the parent of the stranger. Such an embodiment is set forth below in reference to FIGS. 4 and 5.

Figure 4:
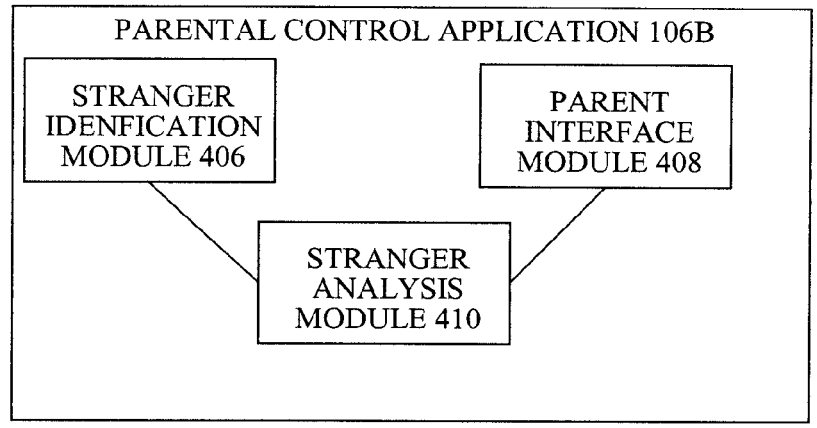
FIG. 4 is a block diagram illustrating a parental control application in accordance with another embodiment of the present invention.

FIG. 4 is a block diagram illustrating a parental control application 106B in accordance with another embodiment of the present invention. Parental control application 106B of FIG. 4 is similar to or identical to parental control application 106 of FIG. 1 yet includes more details.

Referring now to FIG. 4, parental control application 106B includes three components in accordance with this embodiment: 1) a stranger identification module 406; 2) a parent interface module 408; and 3) a stranger analysis module 410. Stranger identification module 406, parent interface module 408, and stranger analysis module 410 are similar to stranger identification module 306, parent interface module 308, and stranger analysis module 310 of parental control application 106A of FIG. 3 and so are not discussed in detail.

Figure 5:
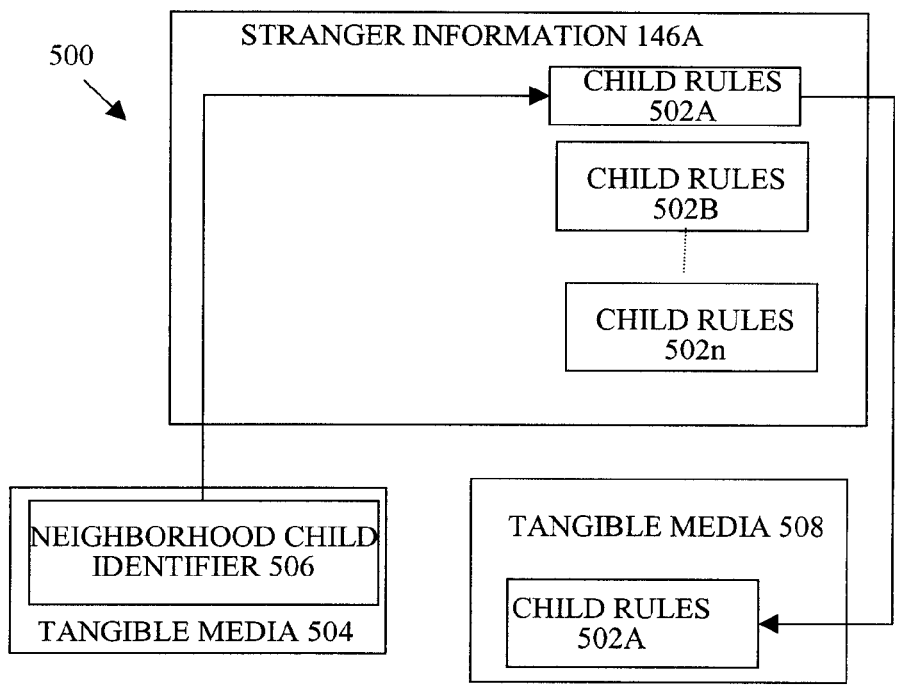
FIG. 5 is a block diagram of a system for managing child rules in accordance with one embodiment of the present invention.

FIG. 5 is a block diagram of a system 500 for managing child rules in accordance with one embodiment of the present invention. System 500 includes stranger information 146A, a database of child rules 502A, 502B, ... 502n, corresponding to n children. Illustratively, the parents of the n children have previously established child rules 502A, 502B, ..., 502n for their children, e.g., using a parent interface module similar or the same as parent interface module 408 of parental control application 106B of FIG. 4. To further illustrate, a first parent establishes child rules 502A for their child, referred to herein as a neighborhood child, using a parent interface module, a second parent establishes child rules 502B for their child using a parent interface module, and so on.

Referring now to FIGS. 2, 4, and 5 together, parent interface module 408 is used by the parent to define child rules in DEFINE CHILD RULES OPERATION 204, which are stored in stranger information 146A as discussed above, and to define friend rules in DEFINE FRIEND RULES OPERATION 206.

A stranger, e.g., a child in the neighborhood, requests to be a new friend of the child and flow moves through CHECK OPERATION 208 and IDENTIFY STRANGER OPERATION 209. In accordance with one embodiment, the operation of the stranger requesting to be a new friend of the child is a real-life operation. For example, the stranger, hereinafter referred to as the neighborhood child for ease of discussion, comes to the door of the house in which the child lives.

In RETRIEVE STRANGER INFORMATION OPERATION 210, the child rules established for the neighborhood child are retrieved. In accordance with this embodiment, the parent of the neighborhood child has previously established child rules for the neighborhood child, which are stored in stranger information 146A as child rules 502A as discussed above.

In accordance with one embodiment, the neighborhood child simply provides their name, which the parent inputs using parent interface module 408. Stranger identification module 406 uses the neighborhood child's name as an index into stranger information 146A to pull the particular child rules for the neighborhood child in RETRIEVE STRANGER INFORMATION OPERATION 210.

However, due to privacy concerns, other lookup mechanisms not using the neighborhood child's name are used in other embodiments. For example, the neighborhood child or the parent of the neighborhood child provides an index, sometimes called a lookup code, which the parent inputs using parent interface module 408. Stranger identification module 406 uses the lookup code as an index into stranger information 146A to pull the particular child rules for the neighborhood child in RETRIEVE STRANGER INFORMATION OPERATION 210.

In yet another embodiment, as shown in FIG. 5, the neighborhood child provides a tangible media 504 having a neighborhood child identifier 506, e.g., a unique eight digit ID. Neighborhood child identifier 506 is an index into stranger information 146A that is used to pull the particular child rules for the neighborhood child in RETRIEVE STRANGER INFORMATION OPERATION 210.

For example, tangible media 504 is a tear off sheet, i.e., a piece of paper, that contains a unique lookup code, i.e., neighborhood child identifier 506, for the neighborhood child.

In another embodiment, tangible media 504 is a microchip that contains a unique lookup code, i.e., neighborhood child identifier 506, for the neighborhood child. The neighborhood child carries the microchip or otherwise has the microchip attached, e.g., on a wristband or embedded within the neighborhood child. The parent retrieves neighborhood child identifier 506 from the microchip, e.g., by scanning the microchip or otherwise. Another example of tangible media 504 is a Radio-frequency identification (RFID) tag.

The parent enters the neighborhood child identifier 506 using parent interface module 408, and stranger identification module 406 retrieves the particular child rules for the neighborhood child in RETRIEVE STRANGER INFORMATION OPERATION 210.

In accordance with another embodiment, the neighborhood child provides their particular child rules using a tangible media 508 as illustrated in FIG. 5. In accordance with one example, tangible media 508 is a Cardspace or OpenID identity, e.g., a card containing a microchip containing child rules 502A for the neighborhood child. The parent retrieves child rules 502A from tangible media 508, e.g., by scanning tangible media 508, by placing tangible media 508 into a card reader, or otherwise.

From RETRIEVE STRANGER INFORMATION OPERATION 210, COMPARE STRANGER INFORMATION TO FRIEND RULES OPERATION 212 is performed as discussed above. Based on the comparison, the parent is notified whether the neighborhood child is allowed to be a new friend in STRANGER ALLOWED TO BE NEW FRIEND CHECK OPERATION 214, is block from being a new friend in STRANGER BLOCKED FROM BEING NEW FRIEND CHECK OPERATION 220, or whether stranger restriction should be applied in APPLY STRANGER RESTRICTIONS OPERATION 224. The parent can then decide whether to allow the relationship with the neighborhood child (OPERATION 216), to block the relationship with the neighborhood child (OPERATION 222) or to otherwise restrict the relationship.

In one embodiment, parent control application 106B only indicates whether the relationship with the neighborhood child should be allowed, blocked, or restricted. More particularly, the child rules for the neighborhood child are not disclosed ensuring privacy for the neighborhood child.

However, in another embodiment, the child rules for the neighborhood child are disclosed. For example, the parent of the neighborhood child wishes that the child rules for the neighborhood child are disclosed. In this manner, the parent can monitor the neighborhood child to prevent the child rules for the neighborhood child from being violated.

Referring again to FIG. 1, parental control application 106 is in computer memory 114. As used herein, a computer memory refers to a volatile memory, a non-volatile memory, or a combination of the two.

Although parental control application 106 is referred to as an application, this is illustrative only. Parental control application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a tangible medium configured to store computer readable code including CD-ROM discs, DVDs, ROM cards, floppy discs, magnetic tapes, computer hard drives and servers on a network.

As illustrated in FIG. 1, this medium may belong to the computer system itself. However, the medium also may be removed from the computer system. For example, parental control application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, child computer system 102 and/or server computer system 130 is a portable computer, a workstation, a two-way pager, a cellular telephone, a digital wireless telephone, a personal digital assistant, a server computer, an Internet appliance, or any other device that includes components that can execute the parental control functionality in accordance with at least one of the embodiments as described herein. Similarly, in another embodiment, child computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the parental control functionality in accordance with one embodiment of the present invention can be implemented in a wide variety of computer system configurations. In addition, the parental control functionality could be stored as different modules in memories of different devices. For example, parental control application 106 could initially be stored in server computer system 130, and then as necessary, a portion of parental control application 106 could be transferred to child computer system 102 and executed on child computer system 102. Consequently, part of the parental control functionality would be executed on processor 134 of server computer system 130, and another part would be executed on processor 108 of child computer system 102. In view of this disclosure, those of skill in the art can implement various embodiments of the present invention in a wide-variety of physical hardware configurations using an operating system and computer programming language of interest to the user.

In yet another embodiment, parental control application 106 is stored in memory 136 of server computer system 130. Parental control application 106 is transferred over network 126 to memory 114 in child computer system 102. In this embodiment, network interface 138 and I/O interface 110 would include analog modems, digital modems, or a network interface card. If modems are used, network 126 includes a communications network, and parental control application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
    executing, on a processor, a parent control application, wherein said executing includes:
        defining child rules for a child, wherein the child rules include off-line rules for the child imposed by a parent, wherein the off-line rules comprise one of or a combination of where, when, how and what activities the child is allowed to participate in;
        defining friend rules for on-line access to the child wherein the friend rules are defined relative to the child rules and are defined dependent upon particular constraints placed upon allowable, blocked and restricted relationships with the child by the parent;
        retrieving stranger information about a person requesting on-line access to said child, wherein said stranger information comprises characteristics of said person, wherein said stranger information is retrieved from a database of stranger information and said retrieving said stranger information comprises using a unique identifier as an index into said database of stranger information to retrieve said stranger information;
        comparing said stranger information about said person to said friend rules;
        allowing the person to be a friend with the child upon said comparing finding said person is allowed to be a new friend;
        blocking the person from being the friend with the child upon said comparing finding said person is not allowed to be the new friend, and finding said person is blocked from being the new friend; and
        applying stranger restriction on the person upon said comparing finding said person is not allowed to be the new friend, and finding said person is not blocked from being the new friend.

2. The computer-implemented method of claim 1 wherein said defining friend rules is performed with a parent interface module.

3. The computer-implemented method of claim 1 wherein said friend associates with said first user using Instant Message (IM) communication.

4. The computer-implemented method of claim 1 further comprising determining that said person is requesting the on-line access.

5. The computer-implemented method of claim 4 wherein said person requests the on-line access over an instant message (IM) communication channel.

6. The computer-implemented method of claim 5 wherein said determining that said person is requesting the on-line access is performed with an instant messaging (IM) proxy.

7. The computer-implemented method of claim 1 further comprising identifying said person, prior to said retrieving.

8. The computer-implemented method of claim 7 wherein said identifying said person is performed with a stranger identification module.

9. The computer-implemented method of claim 1 wherein said comparing is performed with a stranger analysis module.

10. The computer-implemented method of claim 1 wherein said stranger information is retrieved from a database of stranger information and placed on a tangible media.

11. The computer-implemented method of claim 1 wherein said child rules are selected from the group consisting of what, where, when, and how off-line child rules for the child.

12. A computer program product comprising a non-transitory computer readable medium containing computer program code comprising:
    defining child rules for a child, wherein the child rules include off-line rules for the child imposed by a parent, wherein the off-line rules comprise one of or a combination of where, when, how and what activities the child is allowed to participate in;
    defining friend rules for on-line access to the child wherein the friend rules are defined relative to the child rules and are defined dependent upon particular constraints placed upon allowable, blocked and restricted relationships with the child by the parent;
    retrieving stranger information about a person requesting on-line access to said child wherein said stranger information comprises characteristics of said person, wherein said stranger information is retrieved from a database of stranger information and said retrieving said stranger information comprises using a unique identifier as an index into said database of stranger information to retrieve said stranger information;
    comparing said stranger information about said person to said friend rules;
    allowing the person to be a friend with the child upon said comparing finding said person is allowed to be a new friend;
    blocking the person from being the friend with the child upon said comparing finding said person is not allowed to be the new friend, and finding said person is blocked from being the new friend; and
    applying stranger restriction on the person upon said comparing finding said person is not allowed to be the new friend, and finding said person is not blocked from being the new friend.

13. A computer system comprising:
    a memory having stored therein a parental control application; and
    a processor coupled to the memory, wherein execution of said parental control application generates a method comprising:
        defining child rules for a child, wherein the child rules include off-line rules for the child imposed by a parent, wherein the off-line rules comprise one of or a combination of where, when, how and what activities the child is allowed to participate in;
        defining friend rules for on-line access to the child wherein the friend rules are defined relative to the child rules and are defined dependent upon particular constraints placed upon allowable, blocked and restricted relationships with the child by the parent;

retrieving stranger information about a person requesting on-line access to said child wherein said stranger information comprises characteristics of said person, wherein said stranger information is retrieved from a database of stranger information and said retrieving said stranger information comprises using a unique identifier as an index into said database of stranger information to retrieve said stranger information;

comparing said stranger information about said person to said friend rules;

allowing the person to be a friend with the child upon said comparing finding said person is allowed to be a new friend;

blocking the person from being the friend with the child upon said comparing finding said person is not allowed to be the new friend, and finding said person is blocked from being the new friend; and applying stranger restriction on the person upon said comparing finding said person is not allowed to be the new friend, and finding said person is not blocked from being the new friend.

* * * * *